July 22, 1969 K. C. GOODMAN 3,457,005

CUER FOR SLIDE OR FILM STRIP PROJECTOR

Filed Jan. 11, 1967

INVENTOR.
Kenneth C. Goodman
BY
Wood, Herron & Evans
ATTORNEYS

United States Patent Office 3,457,005
Patented July 22, 1969

3,457,005
CUER FOR SLIDE OR FILM STRIP PROJECTOR
Kenneth C. Goodman, 2528 Swansea Road, Columbus, Ohio 43221
Filed Jan. 11, 1967, Ser. No. 608,587
Int. Cl. G03b *31/06*
U.S. Cl. 352—17 3 Claims

ABSTRACT OF THE DISCLOSURE

A device for cuing a slide or film strip projector in response to an electrically sensible pencil mark placed on a tape in a magnetic tape recorder. The marks are placed on the tape in relation to narration thereon about a particular frame or slide. As the tape is drawn past two electrodes on the cuer the mark closes a circuit between them, switching a first and then a second transistor into conducting states and thereby activating a relay. The relay in turn actuates a projector incrementing mechanism and thereby advances the strip or slide.

This invention relates to a method and apparatus for actuating a projector to automatically increment or advance a film strip, slide or the like, and, more specifically, to a method and apparatus for automatically actuating a projector in synchronism with a sound reproducing device for correlating the audio and visual portions of a program.

Systems of the type in which this invention finds particular utility generally include a sound recording device operated in conjunction with a picture reproducing machine. In practice, the sound reproducing equipment is usually a magnetic tape recorder, which is adapted to function continuously, providing an uninterrupted audio program, while the picture reproducing equipment is a slide or strip film projector, which operates on an intermittent basis providing pictures in a sequential mode. The system in which this invention is used also includes a cuing device which has, as its overall function, the correlation and synchronization of the intermittently projected pictures with the continuously reproduced sound to thereby provide a coherent presentation comprising both the audio and visual portions. Typically, the cuing device is associated with the tape recorder. More particularly, the cuing device operates in conjunction with sensible indicia on the tape and is adapted to periodically actuate the projector in response to the sensing of such indicia so that the timing of the projected pictures bears a logical relationship to the sound being continuously produced by the recorder.

The cuing devices suggested by the prior art for use in these systems have taken a variety of forms, none of which have been entirely satisfactory. For example, some of the prior art cuer proposals are based on a principle in which conductive strips of metallic foil are secured to the sound tape by adhesives and, when sensed, function to actuate a projector in synchronism with the sound being reproduced. The problem with this proposed approach is that the conductive strip unduly increases the thickness of the magnetic tape and as a result interferes with the coaction between the tape and the magnetic transducer during the tape reading operation, degrading the sound reproduction process. In addition, the conductive strip may pry loose, causing jamming of the tape in the transducer. Furthermore, the conductive strip unduly stiffens the tape, preventing proper conformity of the tape to the transducer surface with which it intimately contacts during the sound reproduction process. Finally, the conductive strip cannot always be removed without damaging the magnetic recording medium.

Another cuing approach which has frequently been suggested involves the placing of notches in the edge of the recording medium. The notches are adapted to engage a feeler, as the tape is drawn through the recorder, tripping a switch and actuating the projector. This approach has also not been satisfactory because the notch unduly weakens the tape, increasing the probability of producing tears in the magnetic tape. In addition, the removal of material requires special purpose notching equipment. Furthermore, it destroys any sound which may have been recorded on the portions of the tape removed.

A further approach has been suggested in the past which comprehends providing perforations in the tape which are subject to detection by photo or mechanical sensing arrangements. This approach, like the previous approaches, weakens the tape, requires special perforating equipment, and prevents recording of sound on that portion of the tape which has been removed.

Finally, it has been suggested that information in the form of tones or periods of silence be included in the material recorded on the sound tape. Such information can be used to actuate tone or silence responsive filter networks for operating the projector. The use of tones or bands of silence, however, has serious drawbacks. For example, if tone signals are used, special signal generating equipment is required to record the tone as well as to sense it. If bands of silence are employed to actuate the projector, a certain portion of the tape is necessarily unavailable for recording the sound or audio portion of a presentation. Hence, the sound portion of the presentation is not without interruptions.

It is the principal object of this invention to provide an improved method of cuing which does not require any special equipment such as notchers, tone generators, and the like, and which does not interfere with the transducing operation or weaken the tape, but yet which permits continuous recording of sound over the entire portion of the tape. This object is accomplished in accordance with the principles of this invention by employing a very unobvious, yet simple, approach in which the cuing signals on the tape are in the form of sensible pencil marks placed directly over the magnetically recorded sound information using a conventional lead pencil. The marks can then be electrically sensed and the projector actuated, producing the desired synchronization between the audio and visual portions of a presentation.

It has been a further objective of this invention to provide a simple and reliable detector for sensing the pencil cuing marks on the tape as the tape is processed during the sound reproduction operation. In accordance with the principles of the invention, this objective is accomplished by mounting a pair of spaced electrodes in sensing relationship with the tape and connecting to the electrodes an actuating circuit which advances the projector when the electrodes are coupled by a sensed pencil mark. The actuating circuit, in more detail, includes a transistor biased to switch states and thereby actuate the projector when its input circuit resistance, which includes the electrodes, is altered by the presence of a pencil mark at the detecting station.

An advantage of the detector of this invention is that it can be constructed as an integral unit for detachable mounting to the side of a tape recorder, thereby enabling the cuing method and apparatus of this invention to be used in conjunction with existing tape recording equipment without need for special modifications which limit or otherwise interfere with the normal use of the recorder.

Other objectives and advantages of this invention will be more readily apparent from a detailed description of the invention taken in conjunction with the accompanying drawings in which.

Figures 1, 2, 3:
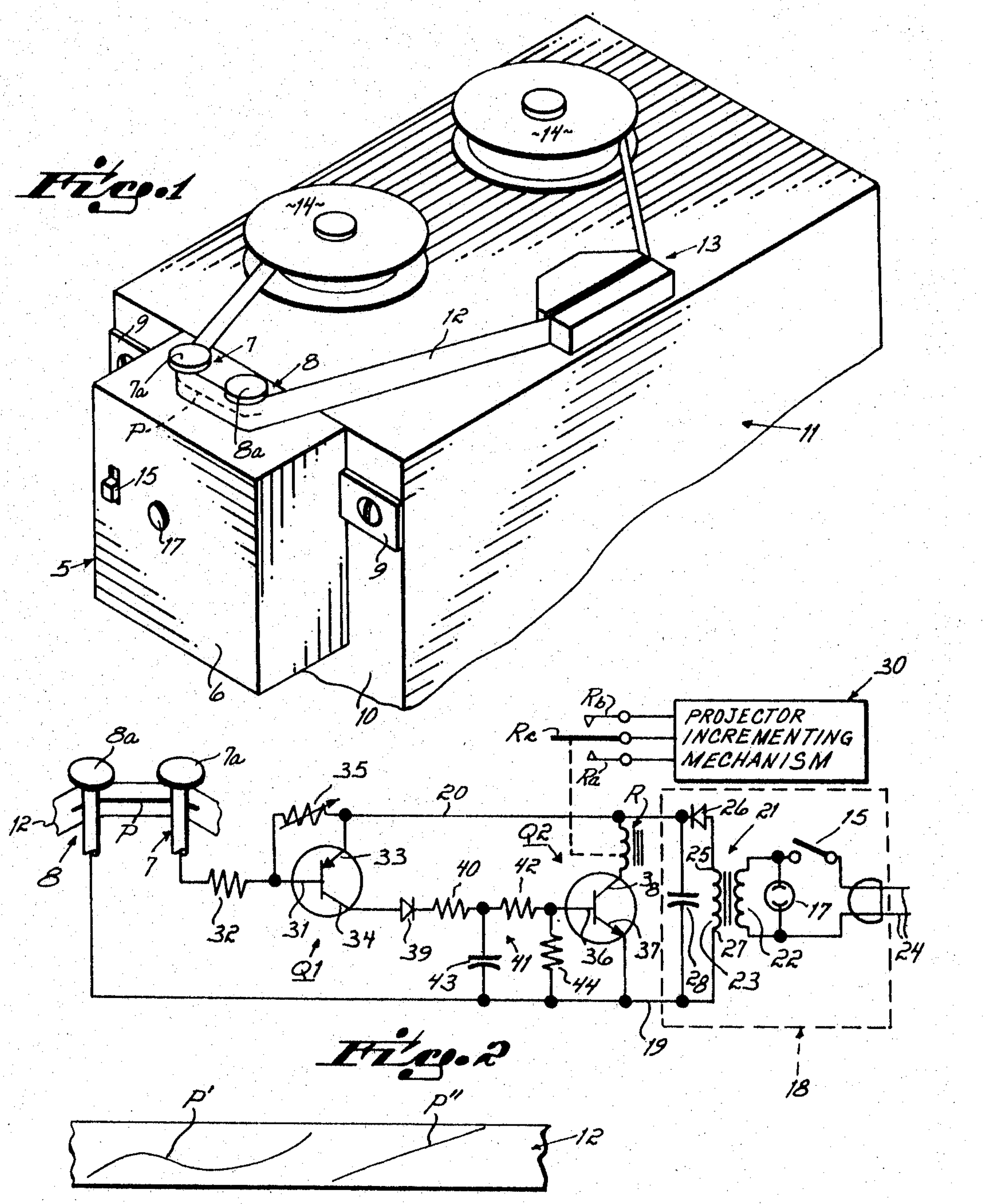
FIGURE 1 shows a schematic view in perspective of a tape recorder having operatively mounted thereto a cuer constructed in accordance with the principles of this invention.
FIGURE 2 shows a schematic diagram of an actuating circuit which is responsive to the bridging of the electrodes for advancing a projector to which it is connected in use.
FIGURE 3 shows, relative to the tape, two possible configurations and orientations of pencil marks.

One preferred form of cuer constructed in accordance with the principles of this invention is shown in FIGURE 1 in operative relation with a sound recording device with which it finds particular utility. The cuer, indicated generally by the numeral 5, includes a housing 6 for enclosing and supporting various operating components to be described and a pair of spaced, upstanding electrodes 7 and 8 which project from the top surface of the housing 6 for cooperation with a sound recording medium 12 in a manner also to be described. The lower ends of the electrodes 7 and 8 extend into the housing 6 for connection to an electrical actuating circuit depicted in FIGURE 2. The electrodes 7 and 8, and the actuating circuit of FIGURE 2 to which they are connected, combine to form a detector for sensing marks P on the sound recording medium 12.

The cuer 5 is mounted by means of suitably configured brackets 9 to a side 10 of a magnetic tape recorder 11 with its electrodes 7 and 8 in operative relationship to the magnetic recording medium or tape 12. More specifically, the cuer 5 is mounted relative to the tape recorder 11 in a manner such that the electrodes 7 and 8, during the sound reproducing operation, are each in continuous electrical contact with different portions of the magnetic tape 12 as the tape is drawn in sensing relationship past a magnetic transducer 13 under the action of tape reels 14. To prevent the tape from sliding off the electrodes 7 and 8 during operation, the electrodes are provided with enlarged heads 7(*a*) and 8(*a*). The cuer 5 also includes an on-off switch 15 for controlling the energization of the electrical components of the cuer actuating circuit contained within the housing 6 and a visible indicating lamp 17 for giving an indication of the cuer circuit energization state.

Assuming the switch 15 is located in the "on" position as indicated by the illuminated condition of the lamp 17, the cuer 5 is in an energized condition and capable of controlling, in response to the marks P which are placed on the tape 12 in a manner to be described, the incrementing of film frames or slides through a projector (not shown) to which the cuer is operatively connected in a manner which is also to be described. With the cuer 5 energized, the drive mechanism (not shown) of the recorder 11 is ready for actuation. Upon actuation, the tape drive mechanism (not shown) rotates the reels 14 so as to draw the tape 12 past the electrodes 7 and 8 to facilitate the mark sensing operation as well as through the transducer 13 for sound reproduction purposes in a manner well-known in the art. Each time the electrodes 7 and 8 are bridged or coupled by a mark P placed on the tape 12, the cuer 5 is actuated, causing the film or slide advancement mechanism of the projector (not shown) to be incremented.

The marks P which are placed on the tape 12 for actuating the cuer in accordance with the principles of this invention comprise pencil marks and may be produced using a conventional lead pencil in any convenient manner. As those skilled in the art will understand, the pencil marks placed on the tape 12 must be of sufficient length to momentarily electrically bridge or couple the electrodes 7 and 8 as the tape is drawn past the electrodes. This minimum length, of course, depends on the electrode spacing. In addition, the marks P must be located on a side of the tape 12 such that they pass in contact with the electrodes 7 and 8 as the tape is driven through a sound reproduction operation. The marks P are located relative to the information being sensed by the transducer 13, at points such that the cuer is actuated, advancing the projector, in synchronism with the sensing by the transducer 13 of the appropriate material recorded on the tape 12 with which the particular frame or slide is associated. By such location of the pencil marks P on a tape 12 relative to the material being sensed by the transducer 13, the projector is periodically actuated producing the desired correlation between the audio and visual portions of a presentation provided by the tape 12 and the film or slides, respectively.

The electrical portion of the cuer, as shown more particularly in FIGURE 2, includes a direct current power supply 18 having, as its output, a negative line 19 and a positive line 20 for providing power to the remaining portions of the circuit. The power supply 18, more specifically, includes a step-down transformer 21 having a primary winding 22 and a secondary winding 23. The primary winding 22 is connected across a source of alternating current 24 via the on-off switch 15, as well as across the indicating lamp 17. The secondary winding 23 of the transformer 21 has one of its terminals 25 connected to the positive output line 20 via a rectifying diode 26 and the other of its terminals 27 connected to the negative output line 19. A filtering capacitor 28 connected between the cathode of the diode 26 and the secondary winding output terminal 27 is provided for smoothing the half-wave rectified signal output provided by the diode 26.

In operation, smoothed direct current is output from the power supply 18 on line 19 and 20 by closing the on-off switch 15. Closing of this switch couples the alternating current source 24 to the transformer 21 producing, across secondary winding 23, stepped-down alternating current which is subsequently half-waved rectified by diode 26 and smoothed by the filtering capacitor 28. The closing of the on-off switch 15, in addition to coupling the alternating current souce 24 to the transformer 21, is also effective to complete an energization circuit to the indicating lamp 17 providing a visual indication of the energized status of the cuer.

In addition to the electrodes 7 and 8 and the power supply 18, the electrical portion of the cuer 5 further includes a first transistor Q–1, a second transistor Q–2, and a direct current relay R. The transistor Q–1, in response to the bridging of the electrodes 7 and 8 by a pencil mark P on the tape 12, is effective to switch from a non-conducting state to a conducting state, driving transistor Q–2 from a non-conducting state to a conducting state, thereby providing an energization circuit for the relay R which, upon energization, actuates a projector incrementing mechanism 30.

The transistor Q–1, more specifically, includes a base 31 connected to the electrode 7 via a current limiting resistor 32, an emitter 33 connected directly to the positive line 20, and a collector 24 at which the output of the transistor Q–1 is taken. A resistor 35 connected between the emitter 33 and the base 31 is provided for biasing the transistor Q–1 into a non-conducting state in the absence of a pencil mark P on the tape electrically coupling the electrodes 7 and 8. The resistor 35 is preferably variable to permit the sensitivity of the transistor Q–1 to be varied, that is, to permit the change in resistance across electrodes 7 and 8 necessary for producing transistor switching to be varied.

Transistor Q–2, which is responsive to the output from transistor Q–1 taken at the collector electrode 34, includes a base 36, an emitter 37 and a collector 38. The base 36 is connected to the collector 34 of the transistor Q–1 via a diode 39, a current limiting resistor 40 and an RC delay network 41. The delay network 41 includes a resistor 42 connected at one end directly to the base 36 and at the other end to the current-limiting resistor 40 and a capacitor 43 connected directly between the negative line 19 and the junction of the resistors 40 and 42. The base 36 of the transistor Q–2 is also connected to the negative line 19 via a biasing resistor 44. This resistor maintains the transistor Q–2 in a state of nonconduction in the absence of an output from the transistor Q–1 produced as a consequence of the presence of a pencil mark P on the tape 12 bridging the electrodes 7 and 8. The emitter electrode 37 of the transistor Q–2 is connected directly to the negative line 19. The collector electrode 38 of the transistor Q–2 is connected to the relay R, the other terminal of which is connected to the positive line 20. Associated with the relay R are a pair of fixed contacts R–*a* and R–*b* and a movable contact R–*c*. These contacts are connected in any suitable manner to the projector incrementing mechanism 30 for actuating the projector incrementing mechanism in response to the transfer of the movable contact R-*c* when the relay R is energized. The mechanism 30 forms no part of this invention and may be of any suitable type which, in response to the transfer of the contact R–*c*, functions to cause the projector to advance one frame of a film strip or one slide of a slide cartridge. The mechanism, for example, may include an normally inoperative motor adapted to become operative to advance a film or slide in response to the movement of the contact R–*c*.

In operation, in the absence of a pencil mark P on the tape 12 bridging the electrodes 7 and 8, the resistance between the electrodes 7 and 8, which is equal to the resistance of the portion of the magnetic tape therebetween, is extremely high and as a consequence the transistor Q–1 remains biased into non-conduction by the resistor 35. With the transistor Q–1 biased into non-conduction, no appreciable current flows throughits emitter-collector path into the base circuit of transistor Q–2 with the resut that the transistor Q–2 is also maintained in a non-conducting state by its biasing resistor 44. The non-conduction of transistor Q–2 is accompanied by a high emitter-collector junction resistance which effectively opens the energization path for the relay R, preventing its energization. The maintenance of the relay R in the de-energized state prevents the transfer of the movable contact R–*c*, in turn preventing actuation of the projector incrementing mechanism 30. Thus, in the absence of a pencil mark P which bridges the electrodes 7 and 8, the transistors Q–1 and Q–2 do not switch, and the relay R does not energize transferring its movable contact to thereby actuate the projector incrementing mechanism 30 and advance a film or slide.

The projector incrementing mechanism 30 is, however, actuated to thereby advance the slide or film should a pencil mark P on the tape 12 bridge the electrodes 7 and 8. More specifically, the presence of a pencil mark P on the tape 12 bridging the electrodes 7 and 8 reduces the resistance between the electrodes, producing a reduced resistance in the base circuit of the transistor Q–1. The reduced base circuit resistance allows increased current to flow through the resistors 35 and 32, lowering the potential on the base 31 and driving transistor Q–1 from a non-conducting state to a conducting state. The switching of transistor Q–1 is accompanied by an increased current flow in its emitter-collector path which is input to the base circuit to the transistor Q–2, switching transistor Q–2 from a non-conducting state to a conducting state. The conduction of transistor Q–2 is manifested by a reduced emitter-collector junction resistance which permits increased current to flow in the emitter-collector path through the relay R. This increased current through the relay R energizes the relay causing movable contact R–*c* to transfer from the position shown in FIGURE 2, resulting in the actuation of the projector incrementing mechanism 30 and the advance of the film or slide.

As a consequence of the RC timing network 41, the transistor Q–2 is not switched to the non-conducting state immediately upon the termination of the bridging of contacts 7 and 8 by the pencil mark P on the tape 12. Specifically, the relay R remains energized for an extended period allowing the movable contact R–*c* to remain transferred for a period sufficient to insure complete actuation of the projector-incrementing mechanism 30. Hence, the RC timing network 41 prevents premature switching of the transistor Q–2 to the non-conducting state following a mark sensing operation.

Applicant has provided a reliable, yet simple and inexpensive method and device for correlating the audio and visual portions of a presentation. In addition, applicant has provided a cuing device and method which is responsive to cuing marks placed on the audio recording medium by means of a conventional lead pencil, thereby avoiding the necessity of having special equipment for providing the tape with the required sensible cuing marks for actuating the projector. Further, applicant has provided a cuing device and method in which the cuing marks can be placed on the recording medium without interfering with the sensing of the magnetically recorded sound information. In fact, the cuing marks can be placed directly over a portion of the tape upon which is recorded audio information without degradation of the sound reproduced by the interaction of the magnetic transducer and the tape. Finally, applicant's device and method does not require a precise configured or positioned cuing mark. Instead, it is only necessary that the mark be long enough to momentarily bridge the electrodes. As for mark configuration, it may, for example, be a curved mark P′ or a mark P″ which is angularly disposed relative to the edges of the tape, as shown in FIGURE 3.

From the above disclosure of the general principles of the present invention and the foregoing description of a preferred embodiment, those skilled in the art will readily comprehend various modifications to which the invention is susceptible. Accordingly, I desire to be limited only by the scope of the following claims.

Having described my invention, I claim:

1. In a system including a projector for reproducing pictures and a magnetic tape recorder for reproducing sound, cuing apparatus for correlating the projection of successive pictures with the reproduction of said sound from a magnetic tape for providing a coherent and combined audio and visual presentation, said cuing apparatus comprising:

at least one sensible pencil mark on said magnetic tape, said pencil mark being continuous for at least a predetermined distance and being located on said tape at a predetermined point relative to the point bearing the recorded sound with which said pencil mark is associated; and a detector having a pair of electrodes mounted for simultaneously contacting said tape at points spaced less than said predetermined distance for sensing said pencil mark as said tape is processed by said recorder during a sound reproduction operation, said detector including an actuating circuit comprising:

(a) a first transistor having an input circuit connected to said electrodes and biased to be switched from one state to another state in response to the coupling of said electrodes by said pencil mark, and (b) a second transistor connected to the output of said first transistor and biased to switch from a first state to a second state in response to said switching of said first transistor, said second transistor being connected in use to said projector for advancing a picture when said second transistor switches.

2. In a system including a projector for reproducing pictures and a magnetic tape recorder for reproducing sound, the cuing apparatus of claim 1 wherein said actuating circuit further comprises a delay network connected to said second transistor for delaying, until a picture is advanced, the return of said second transistor to said first state following the decoupling of said electrodes by said mark, thereby preventing the failure of a picture to advance in response to a sensed pencil mark.

3. In a system including a projector for reproducing pictures and a magnetic tape recorder for reproducing sound, the cuing apparatus of claim 2 wherein said delay network includes an RC network connected to the base of said second transistor.

References Cited

UNITED STATES PATENTS

| | | | |
|---|---|---|---|
| 3,038,106 | 6/1962 | Cutsogeorge et al. | 317—148.5 |
| 3,052,825 | 9/1962 | Muller | 317—146 |
| 3,110,216 | 11/1963 | Chalfin. | |

NORTON ANSHER, *Primary Examiner.*

DAVID S. STALLARD, *Assistant Examiner.*

U.S. Cl. X.R.

352—24